US012001315B2

(12) United States Patent
K et al.

(10) Patent No.: US 12,001,315 B2
(45) Date of Patent: Jun. 4, 2024

(54) PROVISIONING AND DEBUGGING SYSTEM IN A CLOUD ENVIRONMENT (71) Applicant: SAP SE, Walldorf (DE)

(72) Inventors: Umesh K, Bangalore (IN); Christian Weiss, Speyer (DE); Chuanyu Wang, Shanghai (CN); Mayank Gupta, Bangalore (IN); Gaurav Prabakar, Bangalore (IN); Jovin Jijo, Thrissur (IN); Anirudh Prasad, Malappuram (IN); Zehao Huang, Shanghai (CN)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/667,882

(22) Filed: Feb. 9, 2022

(65) Prior Publication Data

US 2023/0140208 A1    May 4, 2023

(30) Foreign Application Priority Data

Nov. 1, 2021   (IN) .............................. 202111049963

(51) Int. Cl.
*G06F 11/36*   (2006.01)
*G06F 9/455*   (2018.01)

(52) U.S. Cl.
CPC ...... *G06F 11/3636* (2013.01); *G06F 9/45558* (2013.01); *G06F 11/3664* (2013.01); *G06F 11/3696* (2013.01); *G06F 2009/45562* (2013.01)

(58) Field of Classification Search
CPC ............ G06F 11/3636; G06F 11/3664; G06F 11/3696; G06F 9/45558; G06F 2009/45562
See application file for complete search history.

(56) References Cited

U.S. PATENT DOCUMENTS

| 10,223,647 | B1 * | 3/2019 | Ward, Jr. | ............... G06F 9/5011 |
| 10,732,962 | B1 * | 8/2020 | Florescu | .............. G06F 11/0706 |
| 11,829,278 | B2 | 11/2023 | K et al. | |
| 2008/0162707 | A1 * | 7/2008 | Beck | ........................ H04L 69/28 709/229 |
| 2012/0084443 | A1 * | 4/2012 | Theimer | ............. G06F 9/45533 709/226 |
| 2012/0096521 | A1 * | 4/2012 | Peddada | ................. H04L 41/28 726/4 |
| 2012/0102464 | A1 * | 4/2012 | Bates | .................... G06F 11/362 717/124 |

(Continued)

*Primary Examiner* — Wei Y Zhen
*Assistant Examiner* — Brahim Bourzik
(74) *Attorney, Agent, or Firm* — Sterne, Kessler, Goldstein & Fox P.L.L.C.

(57) ABSTRACT

Various embodiments for customizing a dynamic navigation system are described herein. An embodiment operates by receiving a request from a support user device for debug access to an application. A predetermined time period for which to provision a set of computing resources is identified and the set of computing resources are provisioned for a pod on a server. Both a first container including access to a new instance of the application and a second container providing access to a debugger program are generated for the pod. Upon determining that the predetermined time period has expired, access to the provisioned set of computing resources of the pod is revoked, and the provisioned set of computing resources to be made available for other processes of the server.

20 Claims, 4 Drawing Sheets (56) References Cited

U.S. PATENT DOCUMENTS

2013/0152047 A1* 6/2013 Moorthi .............. G06F 11/3688
717/124
2020/0319925 A1* 10/2020 Clampitt, III ....... G06F 9/45558

* cited by examiner

PROVISIONING AND DEBUGGING SYSTEM IN A CLOUD ENVIRONMENT

CROSS-REFERENCE TO RELATED APPLICATIONS

This application claims priority to Indian Provisional Application No. 202111049963 entitled "Secure Debugging In Multitenant Cloud Environment," filed Nov. 1, 2021, which is hereby expressly incorporated herein by reference in its entirety.

BACKGROUND

If a customer has a problem with software they are using, and they cannot resolve this problem on their own, the customer may report this problem to a helpdesk by submitting a software support ticket. Sometimes these tickets are easy to resolve for a support user. Other times, these tickets require further investigation into the code of the software program, such as debugging an actual production environment, to understand the cause of and/or resolve the problem.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

If a customer has a problem with software they are using, and they cannot resolve this problem on their own, the customer may report this problem to a helpdesk by submitting a software support ticket. Sometimes these tickets are easy to resolve for a support user. Other times, these tickets require further investigation into the code of the software program, such as debugging an actual production environment, to understand the cause of and/or resolve the problem.

If a support user needs to investigate a customer issue in a production environment for cloud native application, the support user often needs to first gain access to the customer tenant via a support access tool. This will often give the support user access to the customer tenant, however if the support user needs to debug in a production environment for a specific customer tenant, then the debug environment needs to be setup manually, specific for that support user and tenant. Once support user has completed the investigation, the dedicated debug environment need to be decommissioned manually. Onboarding & decommissioning dedicated debug environment manually for every support user who wishes to debug is not a scalable & effective solution, manual setup will have challenges to meet the required compliance & security.

Also, to provide a support user with direct code access on live software that is being used by other customers could create unanticipated problems. As such, a special debugging environment may need to be set up for the support user that both protects other users from having their software experience degraded by the operations off the support user and provides the support user the access required to resolve or address the support ticket and help the customer with the problem.

Figure 1:
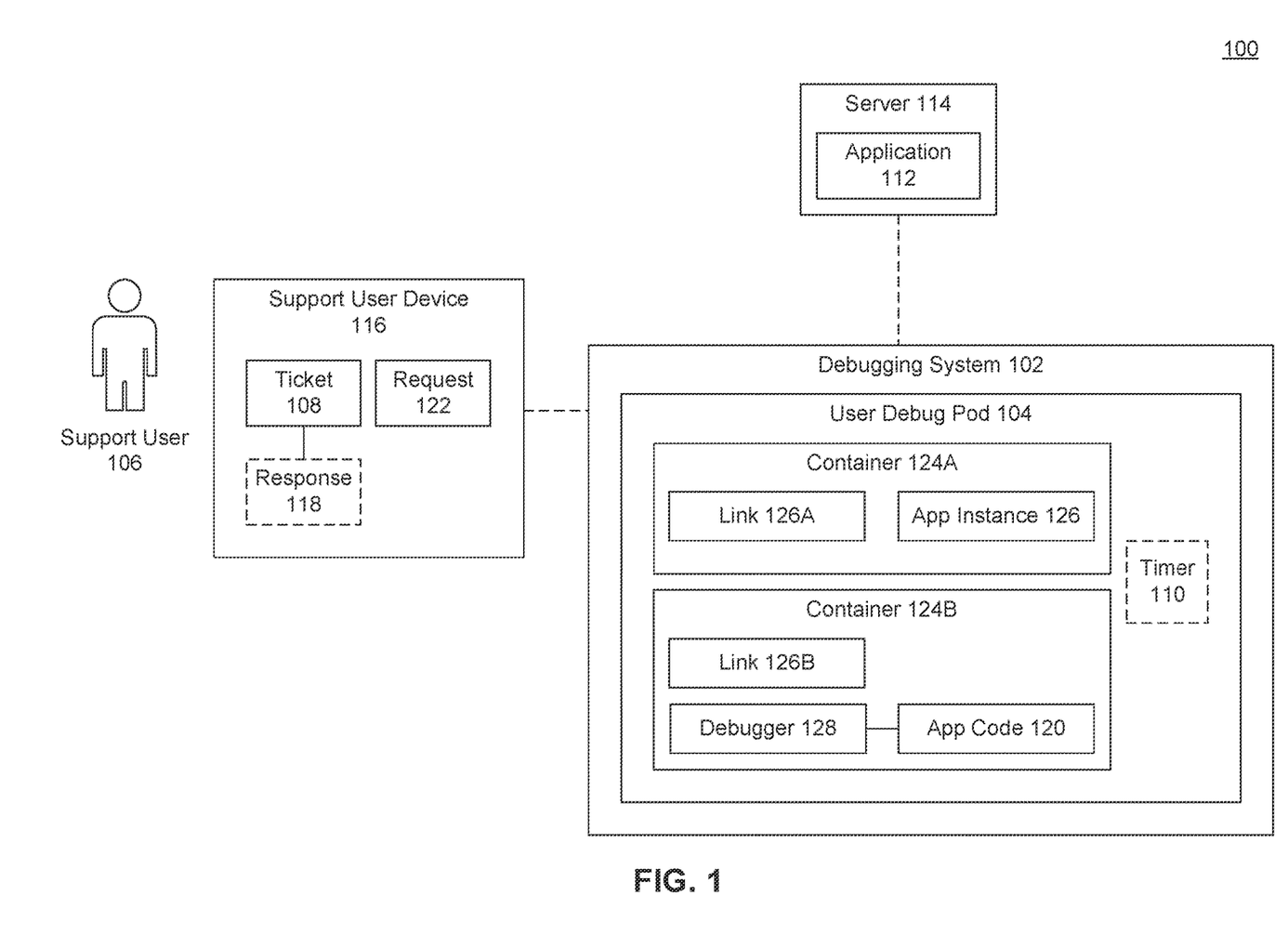
FIG. 1 illustrates a block diagram of a provisioning and debugging system, according to some example embodiments.

FIG. 1 illustrates a block diagram 100 of a provisioning and debugging system 102, according to some example embodiments. Debugging system 102 may provision computing resources for a user debug pod 104 that allows a support user 106 to debug an application 112 in addressing a support request or ticket 108.

In some embodiments, when a support user 106 requests access to a customer tenant or application 112 for debugging, the support user 106 may choose or be assigned an authorization role which grants the debug environment. Once the support user 106 places the request 122 for the access to customer tenant to debug for a specific duration (as indicated by timer 110), debugging system 102 may process the request 122. For example, debugging system 102 may first provision resources for the support user 106 into the target customer tenant application 112 with the required authorization roles, along with this an onboarding request is made to setup a dedicated debug environment or pod 104 specific for the support user 106 and application 112. Once the timer 110 expires, debugging system may then decommission of the debug environment or pod 104.

Pod 104 may be a specifically configured by debugging system 102 to be a temporary computing environment for the support user 106 that allows debug access to application code 120 of application 112 for a predetermined period of time (as indicated by a timer 110). The debug access, provided by pod 104, may allow the support user 106 to enter breakpoints in application code 120 and create logs for the application 112, but may prevent or prohibit the user from changing the production level application code 120. In some embodiments, different support users 106 may be provided with different permissions and access to different functionality and/or portions of application code 120 based on the experience or role of the support user 106, and/or the type of support ticket 108 being processed.

Debugging system 102 may also configured pod 104 to prevent access to by other unauthorized users or devices (including other support users 106), which improves systems security. Debugging system 102 may also automatically be deprovision the computing resources allocated to pod 104 at the expiration of a timer 110 which may prevent computing resources provisioned for the pod 104 to remain allocated for extended and often unnecessary period of times. Debugging system 102 may then reallocate these computing resources to other uses or system processes, including setting up pods 104 for other support users 106.

In some embodiments, a support user 106 may be a help desk or other personnel whose function it is to respond to a ticket 108. Ticket 108 may be a user request or support ticket from a customer or client requesting help with an application 112 or reporting or describing a bug, error, or other difficulty encountered while operating application 112.

In some embodiments, application 112 may be a multitenant application in which a single instance of application 112 executing on a server 114 may be used by or accessible to multiple clients or tenants simultaneously. In some embodiments, server 114 may be a cloud server or a group of servers organized in a cloud computing environment. Application 112 may be live, or production-state program that is being accessed by various clients across one or more instances of application 112 operating on one or more servers 114.

When a client identifies a bug or has another problem or issue with application 112, the client may submit a support ticket 108 describing the problem through the functionality of application 112 itself or through another program or electronic communication (e.g., such as instant message or e-mail). In some embodiments, the support ticket 108 may be received by debugging system 102 which may then distribute the support ticket 108 to an available support user 106 who is responsible for handling and responding to the support ticket 108. Support ticket 108 may be received by support user 106 at support user device 116, which may include any computing device which allows support user 106 to read and respond to ticket 108 and access pod 104.

In some embodiments, support user 106 may evaluate ticket 108 to formulate a response 118. Response 118 may be any form of electronic communication to the client from whom the support ticket 108 was received indicating a resolution of the ticket 108 by support user 106 (which may include elevating or transferring the ticket 108 to another support user 106). Example responses 118 may include electronic messages through application 112, text messages, emails, or even phone calls. If the support user 106 is able to address or resolve the ticket 108 without requiring access to application code 120 of application 112, the support user 106 may generate a response 118 and close out the ticket 108 or the debugging system 102 may automatically close out the ticket 108 upon detecting a response 118.

However, if the support user 106 determines that the ticket 108 requires further inquiry and access to application code 120, support user 106 may send a request 122 for debug access to application 112. The request 122 may include the information from ticket 108 indicating the identity of the support user 106 making the request 122 (to whom the ticket 108 was assigned), a version of the application 112 corresponding to the ticket 108 (that was being accessed by the client when the ticket 108 was generated), an IP (internet protocol) address or MAC (media access control) address or other identifier of the support user device 116, and/or other information that may be required.

In some embodiments, request 122 may indicate the permissions or role of the support user 106 from whom the request was received. These permissions may indicate to what functionality of pod 104 and/or portions of application code 120 the support user 106 is provided access. In some embodiments, the electronic display of the ticket 108 on support user device 116 may include a button that may be selected by support user 106 to submit a request 122 for a pod 104 to respond to the ticket 108.

Upon receiving request 122, debugging system 102 may provision computing resources (e.g., one or more threads for execution, memory, storage, computing cycles, etc.) and set up a user debug pod 104. Pod 104 may include exclusive or shared access to one or more threads of a server or computing system, and/or other computing resources, on which pod 104 was generated or provisioned.

As noted above, debug environment setup or pod 104 may be dedicated for a specific support user 106 who requests 122 debug access. In some embodiments, the debug environment or pod 104 will have information on the allowed users 106 who can access the debug IDE (integrated development environment) or pod 104. In some embodiments, debugging system 102 may use single sign-on authentication to provide secured access to pod 104 and prevent access by other users or from other devices.

In some embodiments, pod 104 may be organized in to two main parts, (1) a front-end html/browser based user interface which is consumed by a support user 106, and can be accessed via the web, and which may offer necessary controls to debug application 112 (as it corresponds to a particular version or app instance 126) and (2) a backend program (e.g., debugger 128) which interfaces with host application 126 to debug the server-side program or application code 120.

In some embodiments, debugging system 102 may set up or generate two computing containers 124A, 124B, as part of pod 104, through which support user 106 may be provided access to the requested functionality. Container 124A may include or provide access to an app instance 126 which may be an executable instance of application 112 corresponding to the proper version as provided in ticket 108 and/or request 122. Container 124B may include or provide access to a debugger 128 and application code 120 corresponding to the proper version of app instance 126.

In some embodiments, the pod 104 offers support users 106 the ability to view the application or source code 120 of the program, software, or application 112 (as used herein, application 112 may be used to refer to the version of application corresponding to app instance 126) to be debugged, including the relevant versions of the code corresponding the version of software indicated in request 122. In some embodiments, pod 104 may also restrict access to certain parts of the application or source code 120 based on permissions, user experience, or role.

In some embodiments, debugger 128 may be a web application that can be deployed in a support user scenario. In some embodiments debugger 128 may enable support user 106 to place a breakpoint in the source code 120, view the call stack, start and stop the debug process, evaluate variables when breakpoints are hit, restrict skipping of program flow, audit log access to the debug tool and variables being evaluated, restrict debugging in certain part of the program or code 120, and restrict changing of variables being evaluated and customer data.

In some embodiments, when the support user 106 tries to place a breakpoint in the app code 120, or debugger 128 may check the scope provided by the application provider to see if that part of source code is allowed for debugging. Upon verifying the authorization or permissions, the breakpoint be set and presented in the user interface for support user 106. Since the application is multitenant, the tenant separation is schema based and application runtime is shared between customers. Breakpoints are at the application runtime level and do not differentiate between tenants or clients.

Pod 104 may allow the support user 106 to only access data of the specific tenant for which the debug environment was set up. For example, this may done by checking the user and tenant details when a breakpoint is hit by evaluating an expression which could fetch these details. Since the debugger is aware of the support user 106 and tenant or customer/client for which the debugger is set up, these details may be cross checked. The support user may then see the breakpoint hit in the user interface only if the breakpoint is hit for that particular user and tenant.

Pod 104 may be configured to prevent support user 106 from altering the production environment For example, this may be done by matching the expressions to be evaluated with a predefined pattern so that only expressions which do not alter the production environment are executed. Pod 104 may also prevent support user 106 from altering the customer data. For example, pod 104 or debugger 128 may check the expressions evaluated with a predefined pattern so that only expressions which do not alter the customer data are executed.

In some embodiments, debugging system 102 may generate individualized or customized links 126A, 126B that provide access to containers 124A, 124B (respectively) to only support user device 116 and/or support user 106. In some embodiments, links 126A, 126B may include configuration information which is used by debugger 128 and/or application 126 to allow or restrict access. In some embodiments, the links 126A, 126B may require or retrieve authentication information from the support user device 116 from which the links 126A, 126B is selected. If the device information (e.g., such as IP address or MAC address of support user device 116) or user login information (e.g., which support user 106 is logged in to support user device 116) does not match the expected authentication information, the links 126A, 126B may not provide access to the containers 124A, 124B. This individualized usage of links 126A, 126B may prevent unauthorized access to the user debug pod 104.

In some embodiments, debugging system 102 may set a timer 110 indicating for how long the computing resources are to be provisioned for a particular pod 104. Timer 110 may include a predetermined amount of time for how long to provision computing resources for pod 104. In some embodiments, the amount of time can be based on available computing capacity, how many different support users 106 are requesting resources, a historical analysis of how long it has taken on average for support user 106 to respond to a ticket 108, the type of support ticket 108, or other factors. In some embodiments, support user 106 may submit with request 122 an initial amount of time (for timer 110) for which the pod 104 is requested.

In some embodiments, the timer 110 may be made visible to support user 106 on support user device 116 when accessing container 124A or container 124B through links 126A, 126B, respectively. In some embodiments, debugging system 102 may provide a visual or audible alert to the user when the timer 110 is about to expire (e.g., five minutes left, 60 second left). In some embodiments, the visual alert may include changing a color of the timer or increasing its size, or providing a new pop-up warning to the support user 106.

In some embodiments, debugging system 102 may provide support user 106 the option of requesting an extension or new time period for timer 110 after less than a threshold amount of time is remaining. For example, if less than five minutes are remaining the support user 106 may request an extension of time, but if more than five minutes are remaining this functionality may be disabled. In some embodiments, the support user 106 may enter the amount of time for the extension.

Debugging system 102 may determine whether to grant the request for an extension of time based on any of the factors described above, as well as whether or not a previous extension of time has been requested by support user 106 for this and/or other tickets 108. In some embodiments, a support user 106 may be granted a limited number of extensions, such as a single extension on a ticket 108 (e.g., and additional extensions may be denied), or the support user 106 may be granted a single extension for every 5 tickets 108, or every 24 hours.

Upon the expiration of timer 110 (which may or may not include an extension of time), debugging system may automatically (without user intervention) deprovision computing resources from pod 104 (including both containers 124A, 124B) and make those computing resources available for other system processes (including new pods 104 for different support users 106). In some embodiments, debugging system 102 may display a visual prompt indicating that the computing resources will be deprovisioned and when the support user 106 selects "ok", the resources may be deprovisioned.

In some embodiments, debugging system 102 may monitor the actions of support user 106 and detect when a response 118 has been submitted or communicated in response to ticket 108. Once debugging system 102 detects response 118 has been submitted, debugging system 102 may automatically deprovision the previously provisioned computing resources to pod 104. In another embodiment, debugging system 102 may display a visual prompt indicating that the computing resources will be deprovisioned and when the support user 106 selects "ok", the resources may be deprovisioned. The support user 106 may have the option to reject the deprovisioning and keep the pod 104 active until the expiration of timer 110.

Figure 2:
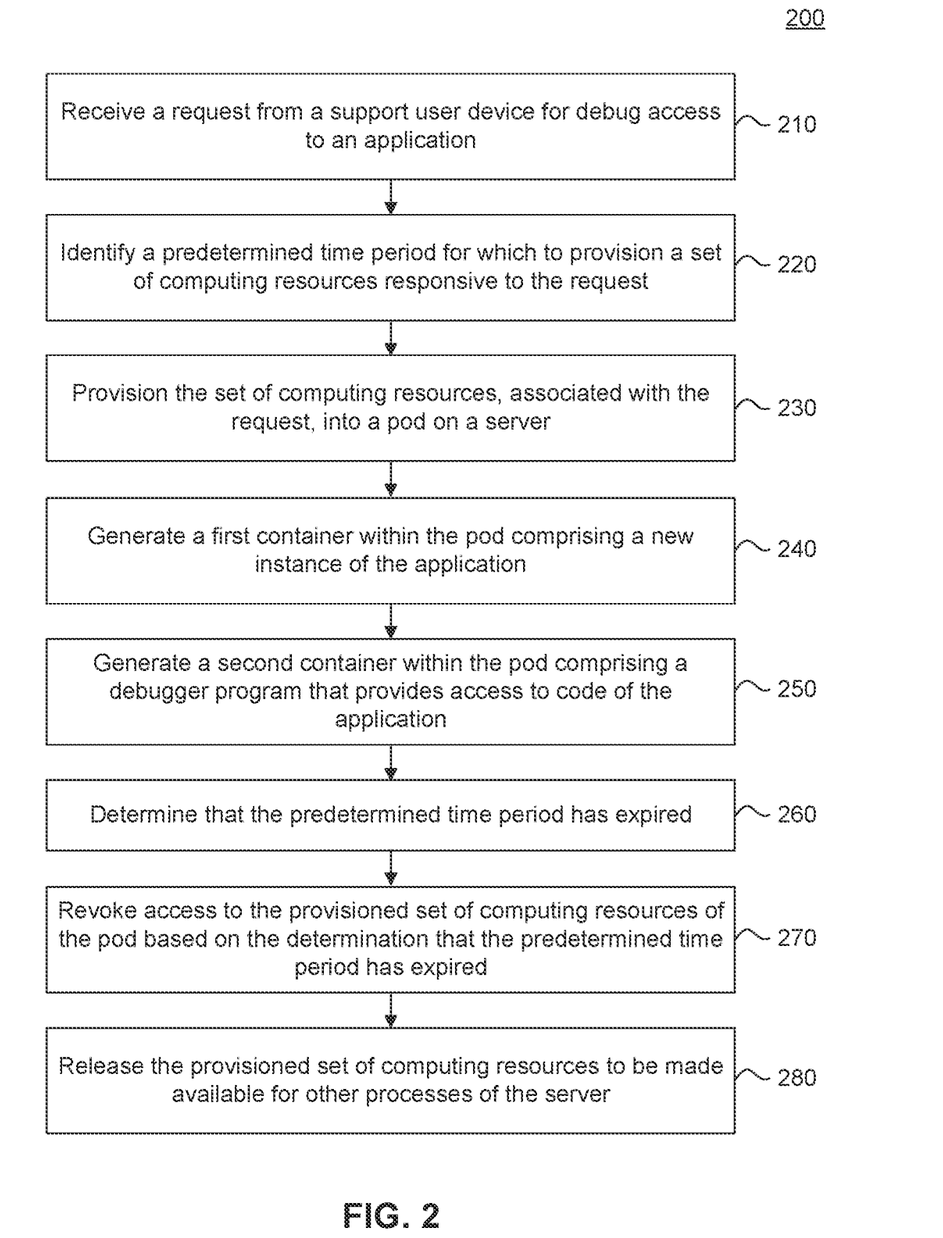
FIG. 2 is a flowchart illustrating a process for a provisioning and debugging system, according to some embodiments.

FIG. 2 is a flowchart illustrating a process 200 for a provisioning and debugging system 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 210, a request is received from a support user device for debug access to an application. For example, debugging system 102 may receive request 122 from support user device 116. Support user 106 may make the request 122 to address ticket 108.

In 220, a predetermined time period for which to provision a set of computing resources responsive to the request is identified. For example, debugging system 102 may determine a specific amount of time for which to provision resources, as indicated by timer 110.

In 230, the set of computing resources associated with the request are provisioned into a pod on a server. For example, debugging system 102 may identify a particular computing device (from a group of possible computing devices) on which to allocate computing resources for pod 104.

In 240, a first container within the pod comprising a new instance of the application is generated. For example, debugging system 102 may generate container 124A which may provide access to app instance 126 corresponding to what version of application 112 was being accessed by a client as indicated in support ticket 108.

In 250, a second container within the pod comprising a debugger program that provides access to code of the application is generated. For example, debugging system 102 may provide access, through container 124B, to a debugger 128 and application code 120 for which the support user 106 has been previously granted permission.

In 260, it is determined that the predetermined time period has expired. For example, debugging system 102 may determine that timer 110 has expired.

In 270, access to the provisioned set of computing resources of the pod is revoked based on the determination that the predetermined time period has expired. For example, debugging system 102 may modify or deactivate links 126A, 126B such that they no longer provide access to pod 104. In some embodiments, support user 106 may be automatically logged out of pod 104, app instance 126, and/or debugger 128 at the expiration of timer 110

In 280, the provisioned set of computing resources is released to be made available for other processes of the server. For example, debugging system 102 may use the previously allocated computing resources to execute other system processes.

Figure 4:
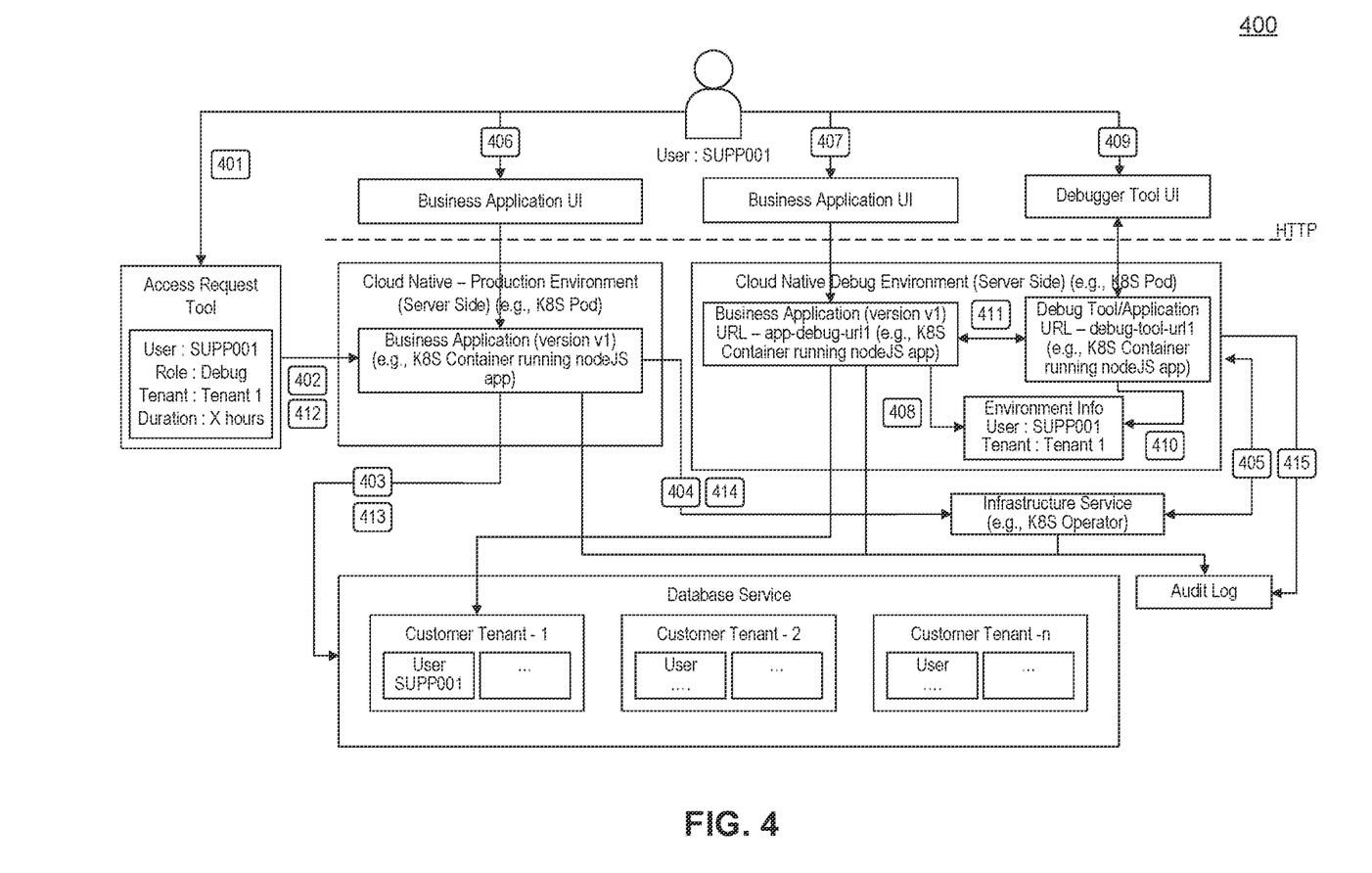
FIG. 4 illustrates a block diagram of a provisioning and debugging system, according to some additional example embodiments.

FIG. 4 illustrates a block diagram 400 of a provisioning and debugging system, according to some additional example embodiments.

At 401, a support user (SUPP001) may submit a request (e.g., request 122) for access to a customer tenant 1, with access role "Debug" (which may have been selected by the support user or assigned by the debugging system 102. At 402, the business application receives request to provision resources and permissions for the support user based on the identified role. At 403, the business application provide authorization or access to the support user into the customer tenant –1 and role.

At 404, business application checks if the role is to "Debug" the application, if yes, then will call an infrastructure service by passing the customer tenant information, application version, user details, to have a dedicated debug environment (e.g., pod 104) provisioned which is unique for a combination of support user and tenant identifier.

At 405, an infrastructure service may provision the dedicated debug environment or pod 104 containing the same version of business application, debug application (e.g., debugger 128) and configuration capturing user and tenant information which describes the scope of access for business application (e.g., application 112 or app instance 126) and debug application.

At 406, once the dedicated debug environment or pod 104 is provisioned, support user will be able to get the "application-debug url" and "debug tool url" (e.g., links 126A, 126B). In some embodiments, these URLs may be unique, and may map to the combination of support user and customer tenant.

At 407, support user may click and launch "application-debug url" with which the support user can access the correct version of business application At 408, when the support user launches "application-debug url" the debugging system 102 will check if the environment is debug and if yes, will check if the login user matches to the user and tenant information available in the environment info, if yes, then will allow the access, otherwise the debugging system 102 will deny the access to pod 104.

At 409, the support user may launch the "debug tool url". At 410, debugging application or debugging system 102, before granting the access, will check if the user requesting access is the same user corresponding to what is available in the environment info, and if yes, the access will be granted.

At 411, support user may start the debug process by attaching the business application to the debugger, and may explore the source code in the debug tool and place breakpoint to debug and evaluate the program variables.

At 412, after the timer 110 for support access duration has expired for the user "SUPP001" in customer tenant 1, debugging system 102 may receive a request to de-provision the user "SUPP001" for customer tenant 1 from "Access Request Tool".

At 413, business application will de-provision the user—"SUPP001" in customer tenant 1. At 414, debugging system 102 may trigger a call to infrastructure service to deprovision the dedicated environment that's been setup for support user "SUPP001" and customer tenant 1. At 415, the infrastructure service will trigger the deprovisioning of the dedicated debug environment.

In some embodiments, user and dedicated debug environment provisioning requests may be logged for audit purpose.

The debugging system 102 described herein may provide fully automated setup of dedicated debug environment as part of support user provisioning. In the absence of such automated setup, a support user would need to make a manual request to the operations team, by sharing the information on customer tenant to which the support user need to access, support user id and application version. Based on the request, the operations team, will create a task along with appropriate priority to provide a dedicated debug environment. Time to get the debug environment available will fully depends on the pipeline of activity operations team has. Onboarding & decommissioning dedicated debug environment will have to be performed manually for every support user who wishes to debug, and is not scalable or reliable, and is both time consuming and subject to human errors. Further, manual setup will have challenges to meet the required compliance & security.

The debugging system 102 described herein may also automatically deprovision the debug environment once the support access has expired, which enables effective resource optimization. Further, debugging system 102 may ensure that there is only one dedicated debug environment is available for a combination of support user and tenant ID.

Figure 3:
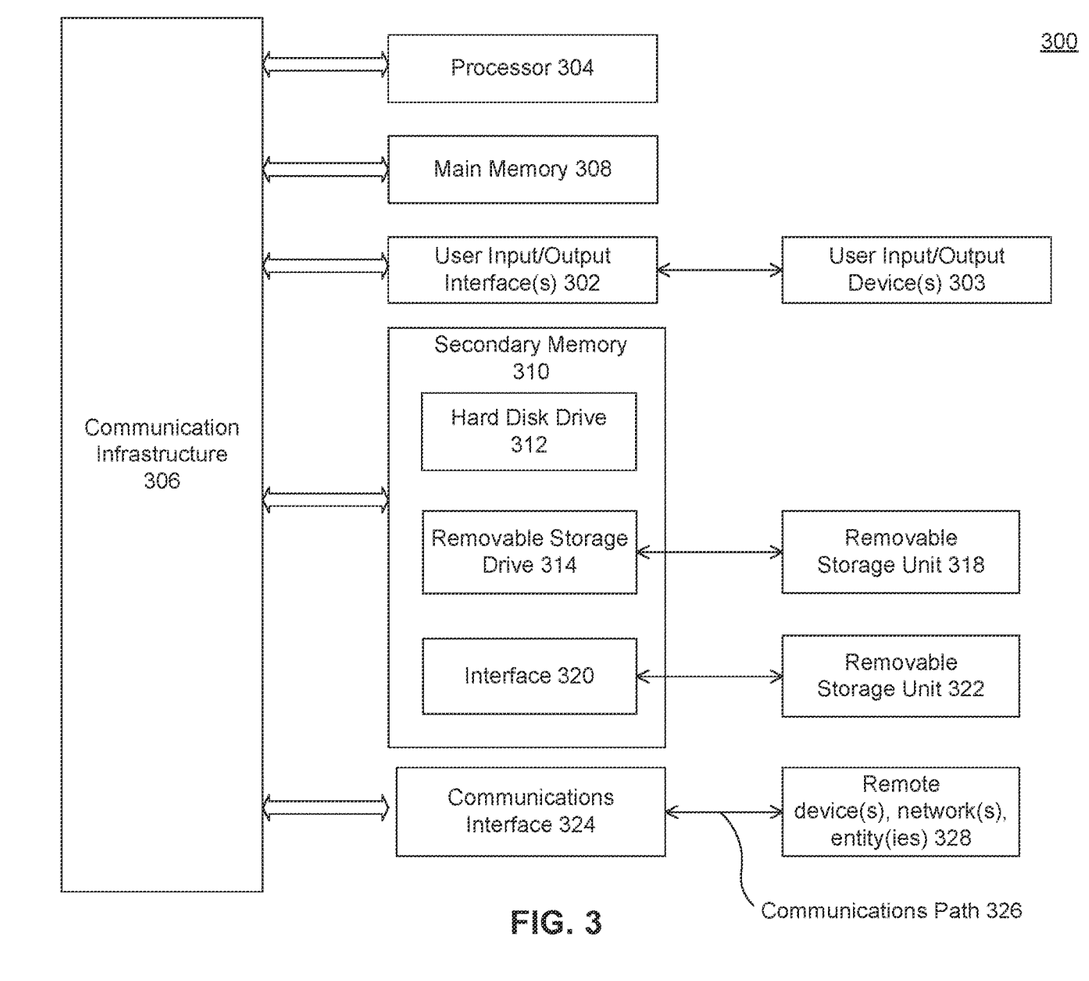
FIG. 3 illustrates an example computer system useful for implementing various embodiments.

Various embodiments and/or components therein can be implemented, for example, using one or more computer systems, such as computer system 300 shown in FIG. 3. Computer system 300 can be any computer or computing device capable of performing the functions described herein. For example, one or more computer systems 300 can be used to implement any embodiments of FIGS. 1-2, and/or any combination or sub-combination thereof.

Computer system 300 includes one or more processors (also called central processing units, or CPUs), such as a processor 304. Processor 304 is connected to a communication infrastructure or bus 306. Computer system 300 may represent or comprise one or more systems on chip (SOC).

One or more processors 304 can each be a graphics processing unit (GPU). in some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (i.e., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, memory card, and/any other computer data storage device. Removable storage drive 314 reads from and/or writes to removable storage unit 318 in a well-known manner.

According to an exemplary embodiment, secondary memory 310 can include other means, instrumentalities or other approaches for allowing computer programs and/or other instructions and/or data to be accessed by computer system 300. Such means, instrumentalities or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which can be wired and/or wireless, and which can include any combination of LANs, WANs, the Internet, etc. Control logic and/or data can be transmitted to and from computer system 300 via communication path 326.

In some embodiments, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving a request from a support user device for debug access to an application;
   identifying a predetermined time period for which to provision a set of computing resources responsive to the request;
   provisioning the set of computing resources, associated with the request, into a pod on a server;
   generating a first container within the pod comprising a new instance of the application;
   generating a second container within the pod comprising a debugger program that provides access to code of the application;
   determining that less than a first threshold amount of time is remaining prior to an expiration of the predetermined time period;
   enabling a request for an extension of the predetermined time period after the determination that less than the first threshold amount of time is remaining and prior to the expiration of the predetermined time period;

receiving an extension request of the predetermined time period;
extending the predetermined time period responsive to receiving the extension request;
determining that the predetermined time period has expired;
revoking access to the provisioned set of computing resources based on the determination that the predetermined time period has expired; and
releasing the provisioned set of computing resources to be made available for other processes of the server.

2. The method of claim 1, wherein the application is a multi-tenant application in which a single instance of the application runs on the server and serves multiple users.

3. The method of claim 1, further comprising:
providing a first link to the first container providing access to the new instance of the application to the support user device.

4. The method of claim 3, further comprising:
providing a second link to the second container providing access to the debugger program to the support user device.

5. The method of claim 4, wherein both the first link and the second link are only operable from the support user device, wherein a selection of either the first link or the second link from a different device would not grant access to either the new instance of the application or the debugger program.

6. The method of claim 1, further comprising:
detecting a response has been submitted from the support user device prior to the determining that the predetermined time period has expired; and
revoking access to the provisioned set of computing resources prior to the determining that the predetermined time period has expired based on detecting the response.

7. The method of claim 1, further comprising:
providing a notification to the support user device that the predetermined time period has expired;
receiving a request from the support user device to extend the predetermined time period by a new time;
extending the predetermined time period by the new time, wherein the revoking access is performed after an expiration of the new time beyond the predetermined time period.

8. A system comprising:
a memory; and
at least one processor coupled to the memory and configured to perform operations comprising:
receiving a request from a support user device for debug access to an application;
identifying a predetermined time period for which to provision a set of computing resources responsive to the request;
provisioning the set of computing resources, associated with the request, into a pod on a server;
generating a first container within the pod comprising a new instance of the application;
generating a second container within the pod comprising a debugger program that provides access to code of the application;
determining that less than a first threshold amount of time is remaining prior to an expiration of the predetermined time period:
enabling a request for an extension of the predetermined time period after the determination that less than the first threshold amount of time is remaining;
receiving an extension request of the predetermined time period;
extending the predetermined time period responsive to receiving the extension request;
determining that the predetermined time period has expired;
revoking access to the provisioned set of computing resources based on the determination that the predetermined time period has expired; and
releasing the provisioned set of computing resources to be made available for other processes of the server.

9. The system of claim 8, wherein the application is a multi-tenant application in which a single instance of the application runs on the server and serves multiple users.

10. The system of claim 8, the operations further comprising:
providing a first link to the first container providing access to the new instance of the application to the support user device.

11. The system of claim 10, the operations further comprising:
providing a second link to the second container providing access to the debugger program to the support user device.

12. The system of claim 11, wherein both the first link and the second link are only operable from the support user device, wherein a selection of either the first link or the second link from a different device would not grant access to either the new instance of the application or the debugger program.

13. The system of claim 8, the operations further comprising:
detecting a response has been submitted from the support user device prior to the determining that the predetermined time period has expired; and
revoking access to the provisioned set of computing resources prior to the determining that the predetermined time period has expired based on detecting the response.

14. The system of claim 8, the operations further comprising:
providing a notification to the support user device that the predetermined time period has expired;
receiving a request from the support user device to extend the predetermined time period by a new time;
extending the predetermined time period by the new time, wherein the revoking access is performed after an expiration of the new time beyond the predetermined time period.

15. A non-transitory computer-readable medium having instructions stored thereon that, when executed by at least one computing device, cause the at least one computing device to perform operations comprising:
receiving a request from a support user device for debug access to an application;
identifying a predetermined time period for which to provision a set of computing resources responsive to the request;
provisioning the set of computing resources, associated with the request, into a pod on a server;
generating a first container within the pod comprising a new instance of the application;
generating a second container within the pod comprising a debugger program that provides access to code of the application;

determining that less than a first threshold amount of time is remaining prior to an expiration of the predetermined time period;

enabling a request for an extension of the predetermined time period after the determination that less than the first threshold amount of time is remaining;

receiving an extension request of the predetermined time period;

extending the predetermined time period responsive to receiving the extension request;

determining that the predetermined time period has expired;

revoking access to the provisioned set of computing resources based on the determination that the predetermined time period has expired; and releasing the provisioned set of computing resources to be made available for other processes of the server.

16. The non-transitory computer-readable medium of claim 15, wherein the application is a multi-tenant application in which a single instance of the application runs on the server and serves multiple users.

17. The non-transitory computer-readable medium of claim 15, the operations further comprising:

providing a first link to the first container providing access to the new instance of the application to the support user device.

18. The non-transitory computer-readable medium of claim 17, the operations further comprising:

providing a second link to the second container providing access to the debugger program to the support user device, wherein both the first link and the second link are only operable from the support user device, wherein a selection of either the first link or the second link from a different device would not grant access to either the new instance of the application or the debugger program.

19. The non-transitory computer-readable medium of claim 15, the operations further comprising:

detecting a response has been submitted from the support user device prior to the determining that the predetermined time period has expired; and revoking access to the provisioned set of computing resources prior to the determining that the predetermined time period has expired based on detecting the response.

20. The method of claim 1, wherein the extension request comprises a requested period of time selected by a user, and wherein the extending comprises extended the predetermined period of time by the requested period of time selected by the user.

* * * * *